(12) United States Patent
Harris

(10) Patent No.: US 10,563,112 B2
(45) Date of Patent: Feb. 18, 2020

(54) METHOD FOR TREATMENT OF UNDERGROUND RESERVOIRS

(71) Applicant: Cleansorb Limited, Guildford, Surrey (GB)

(72) Inventor: Ralph Edmund Harris, Guildford (GB)

(73) Assignee: Cleansorb Limited, Guildford, Surrey (GB)

( * ) Notice: Subject to any disclaimer, the term of this patent is extended or adjusted under 35 U.S.C. 154(b) by 0 days.

(21) Appl. No.: 15/117,638

(22) PCT Filed: Mar. 2, 2015

(86) PCT No.: PCT/GB2015/050598
§ 371 (c)(1),
(2) Date: Aug. 9, 2016

(87) PCT Pub. No.: WO2015/132570
PCT Pub. Date: Sep. 11, 2015

(65) Prior Publication Data
US 2016/0362597 A1    Dec. 15, 2016

(30) Foreign Application Priority Data
Mar. 4, 2014    (GB) .................................. 1403795.6

(51) Int. Cl.
| C09K 8/524 | (2006.01) |
| E21B 43/02 | (2006.01) |
| E21B 37/02 | (2006.01) |
| E21B 17/20 | (2006.01) |
| C09K 8/528 | (2006.01) |
| C09K 8/52 | (2006.01) |
| E21B 37/06 | (2006.01) |

(52) U.S. Cl.
CPC ............... *C09K 8/524* (2013.01); *C09K 8/52* (2013.01); *C09K 8/528* (2013.01); *E21B 17/20* (2013.01); *E21B 37/06* (2013.01); *E21B 43/02* (2013.01)

(58) Field of Classification Search
None
See application file for complete search history.

(56) References Cited

U.S. PATENT DOCUMENTS

| 5,304,547 A * | 4/1994 | Mentink .............. A23C 15/145 424/439 |
| 6,702,023 B1 | 3/2004 | Harris et al. |
| 6,763,888 B1 | 7/2004 | Harris et al. |
| 7,021,377 B2 | 4/2006 | Todd et al. |
| 8,043,996 B2 | 10/2011 | Harris |
| 2004/0140094 A1 * | 7/2004 | Todd ........................ C09K 8/08 166/278 |
| 2009/0038799 A1 | 2/2009 | Garcia-Lopez de Victoria et al. |
| 2009/0181866 A1 | 7/2009 | Reddy et al. |
| 2013/0150272 A1 | 6/2013 | Sonne et al. |
| 2014/0128295 A1 * | 5/2014 | Wagles ..................... C09K 8/08 507/111 |
| 2016/0304765 A1 * | 10/2016 | Kadam ..................... C09K 8/72 |

FOREIGN PATENT DOCUMENTS

| CN | 102382327 | 3/2012 |
| GB | 2405894 | 10/2005 |
| GB | 2463115 | 4/2013 |
| WO | WO 2012/113738 | 8/2012 |

OTHER PUBLICATIONS

Bojinova, T., et al., "Complexes Between β-Cyclodextrin and Aliphatic Guests as New Noncovalent Amphiphiles: Formation and Physicochemical Studies," *Langmuir*, 19:5233-5239 (2003).

Combined Search and Examination Report issued by UK IPO on British Priority Application No. GB 1403795, "Method for treatment of formation damage using cyclodextrin" dated Apr. 22, 2014.

Hodge, R. M., et al., "Evaluation and Selection of Drill-in-Fluid Candidates to Minimise Formation Damage," *SPE Drilling & Completion*, pp. 174-179 (1997).

International Search Report and Written Opinion for International Application No. PCT/GB2015/050598, dated May 26, 2015, Entitled: "Method for Treatment of Underground Reservoirs".

Kameda, E., et al., "Removal of Polymeric Filter Cake in Petroleum Wells: A Study of Commercial Amylase Stability," *Journal of Petroleum Science and Engineering*, 59: 263-270 (2007).

Notification Concerning Transmittal of International Preliminary Report on Patentability for International Application No. PCT/GB2015/050598, "Method for Treatment of Underground Reservoirs", dated Sep. 15, 2016.

Russian Search Report for Application No. 2016138815, "Method for Treatment of Underground Reservoirs", dated May 18, 2018.

* cited by examiner

*Primary Examiner* — Jeffrey D Washville
(74) *Attorney, Agent, or Firm* — Hamilton, Brook, Smith & Reynolds, P.C.

(57) ABSTRACT

The present invention relates to a process for treating formation damage in an underground formation, including damage in the form of an oil-based drill-in fluid filter cake. The process makes use of a treatment fluid that contains a cyclodextrin or a starch and an enzyme capable of generating a cyclodextrin from the starch.

21 Claims, No Drawings

METHOD FOR TREATMENT OF UNDERGROUND RESERVOIRS

This application is the U.S. National Stage of International Application No. PCT/GB2015/050598, filed Mar. 2, 2015, which designates the U.S., published in English, and claims priority under 35 U.S.C. §§ 119 or 365(c) to Great Britain Application No. 1403795.6, filed Mar. 4, 2014. The entire teachings of the above applications are incorporated herein by reference.

The present invention relates to the production of oil, gas or water from wells drilled into underground reservoirs. It is also applicable to injection wells.

During drilling, completion, workover and production operations there are numerous situations where the production or injection rate of an oil, gas or water well following these operations is limited or impaired due to the presence of formation damage. Types of damage include the presence of filter cakes arising from drilling with non-aqueous drill-in fluids or "oil-based muds" (OBMs) including invert emulsion drill-in fluids or muds and synthetic oil-based drill-in fluids including ester-based drill-in fluids and high biodegradability drill-in fluids.

Other types of damage include, but are not limited to, the presence of filter cakes arising from drilling with water-based muds or drill-in fluids, other fluid filtrates or residues (including from hydraulic fracturing fluids, and gravel packing fluids) particulate materials such as fluid loss control agents and weighting agents, rock fines, biofilms, scales, emulsions, "water blocks", pipe dope, asphaltenes and hydrocarbon accumulations, including but not being limited to, waxes and paraffins.

Damage can be near wellbore, for example the presence of filter cake, or damage may be present deeper into the formation, for example in natural or induced fractures or in the rock matrix. The effective removal of damage, especially near wellbore damage such as filter cake, can significantly increase the production rate of hydrocarbon or water producing wells penetrating underground formations. It may also reduce the risk of failure of sand control completions. The effective removal of damage can also increase the injectivity of injection wells.

Hydrocarbons or emulsions present in the wellbore, near wellbore region or deeper into the formation may be highly damaging. Hydrocarbons or emulsions may coat acid-soluble materials and limit the effectiveness of treatments such as acidizing (intended to dissolve acid-soluble components of damage) or of dissolving treatments based on the use of chelating agents. Acid-soluble components include components such as calcium carbonate present in filter cakes produced from drilling with oil-based drilling muds or drill-in fluids. Hydrocarbons derived from the formation may also be present in filter cakes produced from drilling through hydrocarbon-bearing formations with water-based drill-in fluids and may potentially coat acid-soluble components of such filter cakes. Conventional acidizing formulations typically include low concentrations of suitable surfactants to water-wet the surfaces of acid-soluble materials to facilitate their dissolution.

Hydrocarbons may also coat or be present in acid-soluble scales present in the wellbore, formation or tubulars. Often there are alternating layers of scale and hydrocarbons asphaltenes or paraffins. The presence of hydrocarbon, asphaltene or paraffin can make it difficult to dissolve the mineral components of the scale.

The use of micellar dispersions, also known as "transparent emulsions", "micellar solutions" or "microemulsions" has been taught for a number of types of well treatment. Previous teaching has been summarised in U.S. Pat. No. 8,043,996. Use of micellar dispersions to solubilise hydrocarbons, remediate drilling mud damage, increase production or injection rates of wells and treat emulsions and water blocks has been taught. Use of micellar dispersions when perforating, or as a fluid ahead of acidizing treatments has also been taught.

In particular, the use of micellar dispersions to treat filter cakes arising from drilling with oil-based or invert emulsion drill-in fluids has been taught. This includes using micellar dispersions followed by acid treatment, micellar dispersions including acid, micellar dispersions including acid precursors, micellar dispersions followed by chelating agents or micellar dispersions including chelating agents.

Such treatments allow both solubilisation of hydrocarbon in the filter cake and dissolution of calcium carbonate or other material soluble in acids, in-situ generated acids or chelating agents.

However, there are problems associated with the use of micellar dispersions. They contain surfactants. Generally the use of significant amounts of one or more surfactants in the treatment fluid is needed to provide enough solubilisation (micro-emulsification) of the hydrocarbon present in typical OBM filter cakes. Use of 10 to 20% w/v surfactant in treatment fluids is common. In Europe, many surfactants are on the OSPAR Commission Compilation of National Lists of Candidates for Substitution, meaning that there is pressure for their offshore use to be discontinued and their replacement by more acceptable chemicals. Some surfactants effective in micellar dispersions are on these lists. These and other surfactants that may be considered for use in micellar dispersions to treat OBM filter cakes may have relatively high toxicity to marine organisms and their biodegradability may also be less than is desirable.

A further problem is the poor compatibility of many "micro-emulsifying" surfactants with the completion brines in which filter cake treatment fluids are made up. The surfactants may "salt out" of the treatment fluid forming separate liquid or even solid layers. This may compromise or prevent them performing as expected and would certainly have an adverse effect on zonal coverage. Salting out may depend on factors including but not limited to the brine type, brine concentration, pH, temperature and the concentration of other components such as co-surfactants or solvents (including acid precursors) in the treatment fluid. It is necessary to ensure that the surfactant is compatible with the make-up or completion brine and with any other components of the treatment fluid.

There is a continuing need for processes to treat different forms of formation damage, including damage due to drilling with an oil-based or water-based drill-in fluid, deposition of oilfield scales, asphaltene, paraffin or wax, pipe dope, emulsion or water block.

There is a specific need for simple and effective processes to treat filter cakes arising from drilling with oil-based or invert emulsion drill-in fluids, particularly those containing calcium carbonate (or other material soluble in acid or chelating agents) as a weighting and/or fluid loss agent.

There is a particular need for technically effective and more environmentally acceptable alternatives to micellar dispersions for treating oil-based mud drill-in fluid filter cakes, particularly alternatives that do not require the use of surfactants and are compatible with acid, acid precursors or chelating agents.

There is a further need for alternatives to micellar dispersions that are not sensitive to the completion brine composition.

It is desirable to have formation damage remediation processes, including filter cake cleanup processes, based on the use of relatively low concentrations of chemicals. Ideally the chemicals would be very low hazard and based on renewable resources.

It is an object of the present invention to provide simple and effective processes for the remediation of formation damage.

It is a particular object of the present invention to provide simple and effective processes for the effective disruption of oil-based drill-in fluid filter cakes especially over long horizontal intervals and in sand control completions including gravel packs, stand alone and expandable screens.

It is a further object of the present invention to provide simple and effective processes for treating formation damage within an underground reservoir where the treatment fluid provides, within a single stage treatment, the solubilisation of substantially non-polar components of formation damage and also the dissolution of other materials present in the formation damage and soluble in acid (including acid produced from acid precursors) or chelating agents.

It is a specific object of the present invention to provide simple and effective methods for treating oil-based drill-in fluid filter cake damage within an underground reservoir where the treatment fluid provides, within a single stage treatment, the solubilisation of hydrocarbon or other non-aqueous components of the filter cake and the dissolution of fluid loss, bridging or weighting agent materials present in the filter cake, particularly calcium carbonate.

Another object of the present invention is to provide single stage treatment methods which can remove formation damage and also provide further stimulation of the production or injection rate by increasing the permeability of the rock matrix, or of natural or induced fractures.

It is a further object of the present invention to provide methods which are environmentally acceptable by utilising, in at least some embodiments, components which are of low environmental impact and of low hazard to operatives.

Accordingly, the present invention provides a process for treating formation damage in an underground formation, wherein the formation damage is selected from an oil-based drill-in fluid filter cake, a water-based drill-in fluid filter cake, oilfield scales, asphaltene, paraffin, wax, pipe dope, emulsion or a water block, which process comprises:
(a) introducing into the underground formation a treatment fluid comprising water and at least one of (i) a cyclodextrin or (ii) a starch and an enzyme capable of generating a cyclodextrin from the starch; and
(b) allowing the treatment fluid to remediate the formation damage.

The present invention also provides the use of a cyclodextrin for remediating formation damage in an underground formation, wherein the formation damage is selected from an oil-based drill-in fluid filter cake, a water-based drill-in fluid filter cake, oilfield scales, asphaltene, paraffin, wax, pipe dope, emulsion or a water block.

The formation may comprise a hydrocarbon reservoir, for instance a gas or oil reservoir. Alternatively the formation may comprise a water reservoir.

The treatment fluid is typically an aqueous treatment fluid. In the most basic embodiment, treatment fluids of the present invention are comprised of one or more cyclodextrins added to a suitable water or brine, including but not being limited to: fresh water, tap water (city or drinking water), river water, surface water, sea water or oilfield brines.

Suitable cyclodextrins include alpha-, beta- and gamma-cyclodextrin. They may also include chemically modified cyclodextrins, cyclodextrin dimers, cyclodextrin trimers or polymerized cyclodextrin such as those listed in US 2009/0181866, the disclosure of which is herein incorporated by reference in its entirety.

Chemically modified cyclodextrins include, but are not limited to: (1) acylated cylodextrin containing acetyl, propionyl, butyryl, or other suitable acyl groups; (2) hydroxylated cyclodextrin containing hydroxyethyl, hydroxypropyl, or other suitable hydroxy-alkyl groups; (3) carboxylated cylcodextrin containing carboxymethyl, carboxyethyl, or other suitable carboxyalkyl groups, and (4) alkylated cyclodextrin containing methyl, ethyl, propyl, benzyl, or other suitable alkyl groups.

Examples of some of these cyclodextrin derivatives include, but are not limited to, methyl cyclodextrins, hydroxyethyl cyclodextrins, hydroxypropyl cyclodextrins, 2-hydroxyethyl cyclodextrins, carboxymethyl cyclodextrins, and carboxyethyl cyclodextrins.

In certain embodiments, cyclodextrin may have glucose or maltose attached to the cyclodextrin ring, such as glucosyl cyclodextrins and maltosyl cyclodextrins. Specific examples of suitable cyclodextrin derivatives include, but are not limited to, glucosyl-$\alpha$-cyclodextrin, maltosyl-$\alpha$-cyclodextrin, glucosyl-$\beta$-cyclodextrin, maltosyl-$\alpha$-cyclodextrins, methyl-$\alpha$-cyclodextrin, 2-hydroxypropyl-$\beta$-cyclodextrin, hydroxyethlyl-$\alpha$-cyclodextrin, and 2-hydroxypropyl-$\gamma$-cyclodextrin. Combinations of the above-described cyclodextrins may also be suitable.

Examples of suitable oligomerized and/or polymerized cyclodextrins include, but are not limited to, those containing carboxymethyl cyclodextrins, glucosyl cyclodextrins, maltosyl cyclodextrins, hydroxypropyl cyclodextrins, and 2-hydroxypropyl cyclodextrins.

Preferred are those cyclodextrins available in bulk from commercial sources. Most preferred are alpha-, beta- and gamma-cyclodextrin and cyclodextrins modified to increase their solubility in water such as 2-hydroxylpropyl $\beta$-cyclodextrin. In a preferred embodiment, the cyclodextrin is non-polymeric, e.g., monomeric, dimeric or trimeric molecules of cyclodextrin are used (preferably monomeric molecules of cyclodextrin).

The type and concentration of cyclodextrin to be used will be selected according to its effectiveness in the intended application under the conditions of the treatment (for example temperature, brine type and brine concentration). This will be readily known to one skilled in the art or may be readily determined by suitable laboratory testing.

The cyclodextrin may be used at a concentration below or up to its solubility limit in the particular treatment fluid. In some cases it may be used at above its solubility limit in the treatment fluid, in which case a portion of the cyclodextrin may be present as an undissolved dispersion in the treatment fluid. Regardless of whether it is fully dissolved or partially undissolved, the cyclodextrin is mobilized in the treatment fluid.

In some situations, it may be desirable to include one or more additional components that will increase the solubility of the cyclodextrin in the treatment fluid. For example, beta cyclodextrin is soluble to about 2% by weight in fresh water. The solubility of a cyclodextrin in fresh water may be increased up to at least 15% by weight by including sufficient sodium salicylate in the treatment fluid. Thus, in a preferred embodiment the treatment fluid further comprises salicylate, for example sodium salicylate. If present, a preferred concentration for the salicylate component in the treatment fluid is from 1 to 10% by weight, for example from 2 to 5% by weight.

A cyclodextrin may be incorporated directly into the treatment fluid prior to its introduction into the underground formation. Alternatively, in some embodiments cyclodextrin may be generated in the treatment fluid at the surface, during preparation of the treatment fluid and before introducing the treatment fluid into the underground formation. For example, a starch and an enzyme capable of generating a cyclodextrin from the starch may be incorporated into the treatment fluid; the cyclodextrin may then be allowed to generate in the treatment fluid from the starch prior to the introduction of the fluid into the underground formation. Suitable starches and enzymes are further discussed below.

The process of cyclodextrin generation may alternatively be performed substantially downhole, after introduction of the treatment fluid into the wellbore and underground formation. In-situ generation of cyclodextrin may be achieved by introducing a starch and an enzyme capable of generating a cyclodextrin from the starch into the treatment fluid and then introducing the treatment fluid into the underground formation before the cyclodextrin has been generated (or at least fully generated) from the starch. Such in-situ generation may allow the treatment processes to be operated with a delay.

For the avoidance of doubt, it is within the scope of the invention that the starch and the enzyme capable of generating a cyclodextrin from the starch are introduced into the treatment fluid at the surface and that some cyclodextrin is generated both prior to introduction of the fluid into the formation and after the introduction of the fluid into the formation.

The starch may be may be provided in combination with α-amylase. Alternatively, the starch may be a pre-treated starch, e.g. it may be a heat-treated starch or a starch that has been pre-treated with α-amylase. The starch must be capable of generating a cyclodextrin in the presence of the enzyme.

Methods of producing cyclodextrin from starch using enzymes are well understood by those skilled in the art. Typically starch can be liquified either by heat treatment or using α-amylase, then a cyclodextrin glycosyltransferase (CGTase) can be added for the enzymatic conversion of the liquefied starch to cyclodextrin. CGTases are available that can synthesize all forms of cyclodextrins. The ratio in which they are produced is dependent on the enzyme used: each CGTase has its own characteristic α:β:γ synthesis ratio. Some enzymes produce only alpha-, beta- or gamma-cyclodextrin (α- β- or γ-cyclodextrin). Accordingly, the enzyme capable of generating a cyclodextrin from the starch is preferably a cyclodextrin glycosyltransferase.

β-CD is poorly water soluble (about 18.5 g/l); α- and γ-CDs are more soluble (145 and 232 g/l respectively).

Use of a treatment fluid comprised of one or more cyclodextrins in an aqueous fluid may be used to remediate formation damage of the types described herein, for example it may be used to disrupt OBM filter cakes. Without wishing to be bound by theory, it appears likely that the cyclodextrin can directly interact with the hydrophobic components of a filter cake to form a host-guest inclusion complex and that this leads to disruption of the filter cake. Similarly, other types of formation damage containing or comprising a hydrophobic component are amenable to treatment with treatment fluids containing cyclodextrin.

Optionally, the treatment fluid may also comprise one or more water miscible compounds or mutual solvents, Examples of suitable compounds or solvents include but are not limited to lower (C1-C6) alcohols, polyols, ethers and glycols, such as methanol, ethanol, n-propanol, isopropanol, n-butanol, iso-butanol, tert-butanol, butyl monoglycol ether, butyl diglycol ether, butyl triglycol ether, ethylene glycol monobutyl ether, ethylene glycol, diethylene glycol, triethylene glycol, glycerol, diglycerol, polyglycerol and triethyleneglycol monobutyl ether.

Preferably any water miscible compounds will also be biodegradable to an acceptable extent.

In a preferred embodiment, at least one additional component is included in the treatment fluid. The additional component may, for example, be capable of dissolving bridging, weighting or fluid loss materials present in an OBM filter cake. The presence of the additional component(s) typically results in more complete remediation of the formation damage, e.g. more complete solubilisation of an OBM filter cake.

The additional component may be an acid, an organic acid precursor, a chelating agent or a chelating agent precursor. Suitable acids, acid precursors, chelating agents and chelating agent precursors will be well known to those skilled in the art.

The acid may be a mineral acid. A preferred mineral acid is hydrochloric acid. The acid may be an organic acid. Preferred organic acids are formic, acetic, glycolic or lactic acid.

The organic acid precursor may be an ester, lactone, anhydride, orthoester, polyester or polyorthoester. Preferred acid precursors are those which yield formic acid, acetic acid, glycolic acid, lactic acid and/or gluconic acid on hydrolysis. Suitable organic acid precursors will be well known to those skilled in the art. The organic acid precursor will hydrolyse at a predictable rate in the presence of water to generate an organic acid. Those skilled in the art will understand that in-situ acid generation from such precursors will generally deliver much better zonal coverage than fast reacting acids, for example in filter cake treatments.

Organic acids produced from the hydrolysis of the organic acid precursor which are useful in the process of the present invention include any organic acid which reacts with acid-soluble materials to produce salts of sufficient aqueous solubility to ensure substantive dissolution of the acid-soluble materials takes place, for example formic acid or lactic acid generation from an organic acid precursor may dissolve calcium carbonate to produce calcium formate or calcium lactate which have relatively high solubility.

The organic acid precursors will preferably be low hazard and toxicity with a high flash point and high environmental acceptability. Generally they will also be biodegradable to an acceptable extent. The most preferred organic acid precursors are esters or lactones.

Suitable esters include but are not limited to ethylene glycol monoformate, ethylene glycol diformate, diethylene glycol monoformate, diethyl glycol diformate, glycerol monoformate, glycerol diformate, glycerol triformate, glycerol monoacetate, glycerol diacetate, glycerol triacetate, butyl lactate, propyl lactate and ethyl lactate. The preferred lactone is glucono delta lactone.

The chelating agent may be any chelating agent capable of dissolving material present in the underground formation, including, but not being limited to, weighting or fluid loss agents in filter cakes, oilfield scales or the rock matrix. Preferred chelating agents will be well known to those skilled in the art and will include but not be limited to those effective for dissolving carbonates or barite. Suitable chelating agents include nitrilotriacetic acid (NTA), ethylenediamine tetraacetic acid (EDTA), trans-1,2-diaminocyclohexane-N,N,N',N',-tetraacetic acid monohydrate (CDTA), diethylenetriamine pentaacetic acid (DTPA), dioxaoctamethylene dinitrilo tetraacetic acid (DOCTA), hydroxy-ethylethylenediamine triacetic acid (HEDTA), triethylenetetramine hexaacetic acid (TTHA), trans-1,2-diaminocyclohexane tetraacetic acid (DCTA), glutamic acid N,N-diacetic acid (GLDA) and methylglycine N,N-diacetic acid (MGDA). Further chelating agents include malonic acid, oxalic acid, succinic acid, citric acid and hydroxyacetic acid. Salts of the chelating agents may also be used.

In some cases use of precursors of chelating agents ("chelating agent precursors") may be desirable. Suitable chelating agent precursors include but may not be limited to esters, amides and anhydrides of chelating agents.

Esters of chelating agents such as malonic acid, oxalic acid, succinic acid, ethylenediaminetetraacetic acid (EDTA), nitriloacetic (NTA), citric acid, hydroxyacetic acid, glutamic acid N,N-diacetic acid (GLDA) or methylglycine N,N-diacetic acid (MGDA) to generate chelating agents has been taught in U.S. Pat. Nos. 6,702,023, 6,763,888 and WO 2012/113738. If a base is present and the chelating acid is neutralised, it will be understood that salts of such chelating acids may also act as dissolving agents for acid soluble materials as taught in U.S. Pat. No. 7,021,377. The use of amides and anhydrides of GLDA or MGDA has also been taught (see, for example, WO 2012/113738). The contents of all of these documents is herein incorporated by reference in their entirety.

Where acid-soluble materials are mentioned in the current description, this also refers to material soluble in solutions of chelating agents or salts of chelating agents. Preferred chelating agents are low toxicity and readily biodegradeable.

In a preferred aspect of the invention, the formation damage is an oil-based drill-in fluid filter cake. However, in addition to their primary use to treat oil-based drill-in fluid filter cakes, the treatment fluids of the present invention may also be used to treat other types of formation damage amenable to treatment with cyclodextrin-based treatment fluids, including but not being limited to the treatment of filter cakes arising from drilling with water-based drill-in fluids; oilfield scales; asphaltene; paraffin; wax; pipe dope; emulsion or water block.

For treating oil-based drill-in fluid filter cake and other types of formation damage, suitable combinations of cyclodextrin with one or more components selected from a mutual solvent, acid, organic acid precursor, chelating agent or chelating agent precursor may be readily identified or determined by those skilled in the art.

Formation damage treatment situations where it is desirable to incorporate one or more acids, organic acid precursors, chelating agents or chelating agent precursors into the treatment fluid include the treatment of filter cakes produced from drilling with an oil-based or water-based or drill-in fluid, or the dissolution of oilfield scales. In such situations, in addition to solubilising hydrocarbon or asphaltene components of the formation damage with cyclodextrin, the dissolution of fluid-loss, bridging or weighting materials present in the filter cake or the mineral components of the oilfield scale is also desirable.

In addition to dissolving components present in formation damage, any acid, organic acid precursor, chelating agent or chelating agent precursor included in the treatment fluid may, if capable of dissolving at least a portion of the rock matrix, be beneficial for increasing the permeability of the rock matrix adjacent to a wellbore, natural or induced fracture or the conductivity of the natural or induced fracture.

It will be understood that removal of damage may not be complete. The treatment may however be judged a success if damage is at least partially or substantially remediated, for example as measured by an increase in the permeability, resulting in higher rates of production or injection than would be the case with no treatment.

Suitable concentrations of any component of the treatment fluid (cyclodextrin, mutual solvent, acid, organic acid precursor, chelating agent or chelating agent precursor) may be determined by one skilled in the art. A typical concentration of cyclodextrin in the treatment fluid is from 0.2 to 5% w/v, and preferably from 0.5 to 5% w/v, although higher or lower concentrations may be used if effective in the damage treatment application. If the treatment fluid contains a starch that is capable of generating cyclodextrin, then the concentration of cyclodextrin is regarded to be the amount of cyclodextrin that would be present once degradation of the starch by the enzyme is complete.

Typically shut-in periods of between 0.5 hours and 24 hours will be employed to treat the formation damage, although longer or shorter treatment periods may also be used. The well is then put on or returned to production, or in the case of injection wells, put on injection.

Generally it is desirable to treat the well over a period acceptable to the operator. Generally short shut-in periods of hours to a day are to be preferred as these reduce certain costs such as rig time to the operator. However, in some situations such as a filter cake treatment in a well which has been drilled but which is to be shut in for weeks or months before being put on production, treatment over a longer period may be acceptable.

When using organic acid precursors such as esters in treatment fluids, it may be beneficial to include a catalyst such as a lipase, esterase or protease enzyme to accelerate the rate of organic acid generation. It will be understood by those skilled in the art that these enzymes do not possess CGTase activity. CGTase enzymes would be needed to generate cyclodextrin in the treatment fluid.

Where an enzyme is used, it is necessary to select an enzyme which remains active under reservoir conditions and in the treatment fluid for at least as long as the catalytic activity is needed. Typically, isolated enzymes are used. Enzymes may be isolated from plant, animal, bacterial or fungal sources. The enzymes may be produced from wild-type, conventionally bred, mutated or genetically engineered organisms. The enzymes may, optionally, be chemically modified, as long as they retain or possess the desired catalytic ability. Preferably, the enzymes will be industrial enzymes available in bulk from commercial sources.

It may also be possible to use non-enzyme catalysts, or salts of carboxylic acids to increase the rate of hydrolysis of organic acid precursors, as taught by U.S. Pat. No. 6,702,023 and GB2405894.

The chemicals required for the process of the present invention will normally be technical grade to reduce the cost of the process.

The treatment fluids may be prepared by mixing the components in a suitable order as may be readily determined by one skilled in the art.

Typically the treatment fluid is prepared batchwise in tanks or other suitable vessels. In some situations the treatment fluid may be prepared "on the fly" by mixing one or more individual components on a continuous, preferably carefully controlled and monitored basis as the fluid is injected into the underground reservoir. Other methods of preparing the treatment fluid will be well known to those skilled in the art.

The treatment fluid is conveniently introduced into the underground formation via injection or production wells. The wells may be vertical, deviated, inclined or horizontal. If being introduced into a newly drilled well, particularly if being used to remove damage caused during drilling, such as filter cakes, the treatment fluid may conveniently be introduced through the drill string using the mud pumps. The treatment fluid may also be introduced via coiled tubing, bullheading or through a work string or wash pipe.

The low corrosivity of the treatment fluid, in at least some embodiments, will generally permit introduction into the wellbore or formation without the need to add corrosion inhibitors.

Where it is considered desirable, a pre-flush with suitable materials may be carried out ahead of the treatment with the treatment fluid. Similarly, post-flushes with suitable materials may be carried out after treatment.

For near wellbore treatments, such as filter cake treatments, the volume of treatment fluid introduced into the formation will typically be at least equal to the wellbore volume plus an allowance for some leak off into the formation. A fluid volume of between 120% and 200% of the wellbore volume will normally be used although if a high rate of fluid loss is expected a volume up to 300% or higher of the well bore volume may be selected. For treatments where the target is damage deeper into the formation such as in natural or induced fractures or fracture networks a volume will be selected appropriate to the requirements of the treatment.

Treatment fluids of the present invention may contain any other additives commonly added to well treatment fluids such as will be known to those skilled in the art. The treatment fluid may contain further chemical additives such as are commonly used in formation damage treatments, including but not being limited to fines suspenders, iron control agents, surfactants, foaming and biostatic or biocidal agents if their inclusion is deemed to be beneficial and if they are compatible with the other components of the treatment fluid.

The treatment fluids of the present invention are particularly useful for the cleanup of oil-based drill-in fluid filter cake in openhole wells, including filter cake present in sand control completions including screens and gravel packs. They may also be used to treat other types of formation damage including water-based drill-in fluid filter cake, oilfield scales, asphaltene, paraffin, wax, pipe dope, emulsion or water block.

Due to the low viscosity of typical treatment fluids of the present invention, they may be particularly applicable to treatment of gas wells, where clean up of wells after treatment will be facilitated by the low viscosity of the treatment fluid.

The process of the present invention has the following advantages over the prior art.

It can effectively remediate oil-based drill-in fluid filter cake and other formation damage without the use of surfactants, therefore avoiding the problems associated with the use of surfactants. Furthermore, it is effective for cleanup of oil-based drill-in fluids at unexpectedly low concentrations, meaning that lower overall chemical loadings can be used in treatment fluids directed at this application. For example, 2% w/v of beta cyclodextrin has been shown to be as effective as 10% of a typical microemulsifying surfactant (see example 3).

The process is simple, effective, low hazard, based on renewable resources and is of low environmental impact.

In its simplest embodiment, the process uses only cyclodextrin in solution. Cyclodextrin is obtained from starch which is an abundant biopolymer and readily renewable resource. It is low toxicity. Alpha-, beta-, and gamma-cyclodextrin are all generally recognized as safe (GRAS) by the FDA in the United States.

In at least some embodiments, the process uses other components which are highly acceptable from the environmental point of view. For example, preferred embodiments for treating filter cakes or oilfield scales generally use low toxicity, high flash point, and biodegradable organic acid precursors or readily biodegradable chelating agents.

The basic treatment fluid comprising a cyclodextrin solution is not corrosive. In addition, treatment fluids additionally containing acid precursors or chelating agents are generally not highly corrosive, meaning that the use of corrosion inhibitors is generally not required.

Due to the good zonal coverage that can be obtained, particularly in some embodiments such as those that generate acid in-situ, the process of the present invention is particularly effective for the removal of filter cakes over long horizontal intervals and in sand control completions including gravel packs, stand alone and expandable screens. Uniform cleanup of filter cakes in such situations is critical in minimising the risk of premature failure.

In such embodiments, compared to other treatment processes where a separate "live" acid stage may be required, or where "live" acid is incorporated into a treatment fluid to dissolve acid soluble material it is a very low hazard process for the controlled rate dissolution of acid soluble materials. Handling of "live" acid by operators is avoided and there is generally no need for high pressure, high rate injection which is often used in conventional acidizing processes to counter the high reaction rate of "live" acids.

The processes of the present invention may be used for treating new wells or for remedial treatments of wells already on production or injection.

The following example illustrates the invention.

EXAMPLE 1

Breaking of Oil-Based Drill-In Fluid Filter Cake by a Beta Cyclodextrin-Based Formulation The effectiveness of a cyclodextrin-based formulation at breaking an oil-based drill-in fluid filter cake was investigated by making a filter cake in an Ofite double ended HPHT cell (catalogue number OF170-46). The drill-in fluid used was a commercial oil-based drill-in fluid from Nigeria, based on EDC99-DW base fluid and calcium carbonate.

A filter cake was made on a 5 micron ceramic disc. The ceramic disc was first flooded by adding 100 ml of 4% KCl to the HPHT cell, pressurising to 100 p.s.i. with nitrogen gas and then opening the bottom valve to allow 50 ml of the 4% KCl solution to pass slowly through the ceramic disc in the injection direction. The bottom valve was then closed, the HPHT cell depressurised by opening the top valve and the solution above the ceramic disc was poured away. 25 ml of well-mixed oil-based drill-in fluid was then placed in the HPHT cell and the HPHT cell pressurised to 100 p.s.i. for 1 hour, with the bottom valve open to make a filter cake. The bottom valve was then closed and the HPHT cell was depressurised by opening the top valve and the excess liquid mud above the filter cake on the ceramic disc was poured away. The treatment fluid (100 ml) was then placed in the HPHT cell, which was again pressurised to 100 p.s.i. and incubated at the formation temperature (80° C.).

The treatment fluid used was 2% w/v beta cyclodextrin plus 12% w/v ORCA B** in 10% w/v NaCl brine.

After 20 hours the bottom valve was opened to assess if the filter cake was broken. The fast rate of fluid flow out of the bottom valve in the injection direction indicated that the filter cake was broken. The valve was closed and the cell left for a further 44 hours. The cell was opened and the filter cake confirmed to have been effectively disrupted and the carbonate dissolved by the formic acid produced from the acid precursor.

A filter cake made from the same mud was also effectively broken by a micellar dispersion treatment formulation comprised of 10% w/v ORCA*4 plus 12% w/v ORCA B** in 10% w/v NaCl brine.

*ORCA 4 is a microemulsifying surfactant. **ORCA B is a commercial formic acid precursor. Both are available from Cleansorb Limited, Guildford, UK.

EXAMPLE 2

Breaking of Oil-Based Drill-In Fluid Filter Cake by a Beta Cyclodextrin-Based Formulation The effectiveness of a cyclodextrin-based formulation at breaking an oil-based drill-in fluid filter cake was investigated by making a filter cake in an Ofite double ended HPHT cell (catalogue number OF170-46). The drill-in fluid used was a commercial oil-based drill-in fluid from Nigeria, based on EDC99-DW base fluid and calcium carbonate.

A filter cake was made on a 5 micron ceramic disc. The ceramic disc was first flooded by adding 100 ml of 4% KCl to the HPHT cell, pressurising to 100 p.s.i. with nitrogen gas and then opening the bottom valve to allow 50 ml of the 4% KCl solution to pass slowly through the ceramic disc in the injection direction. The bottom valve was then closed, the HPHT cell depressurised by opening the top valve and the solution above the ceramic disc was poured away. 25 ml of well-mixed oil-based drill-in fluid was then placed in the HPHT cell and the HPHT cell pressurised to 100 p.s.i. for 1 hour, with the bottom valve open to make a filter cake. The bottom valve was then closed and the HPHT cell was depressurised by opening the top valve and the excess liquid mud above the filter cake on the ceramic disc was poured away. The treatment fluid (100 ml) was then placed in the HPHT cell, which was again pressurised to 100 p.s.i. and incubated at the formation temperature (53° C.).

The treatment fluid used was 2% w/v beta cyclodextrin plus 10% w/v ORCA B** in an 8.5 ppg KCl brine.

After 24 hours the bottom valve was opened to assess if the filter cake was broken. The rate of fluid flow out of the bottom valve in the injection direction indicated that the filter cake was partially broken. The valve was closed and the cell left for a further 24 hours. The bottom valve was again opened and the fast rate of fluid flow out of the bottom valve indicated an effective break. The cell was opened and the filter cake confirmed to have been effectively disrupted and the majority of the carbonate dissolved by the formic acid produced from the acid precursor.

A filter cake made from the same mud was also effectively broken by a micellar dispersion treatment formulation comprised of 10% w/v ORCA* 4 plus 10% w/v ORCA B** in 8.5 ppg KCl brine after 48 hours at 53° C.

EXAMPLE 3

Breaking of Oil-Based Drill-In Fluid Filter Cake by a Beta Cyclodextrin-Based Formulation The effectiveness of a cyclodextrin-based formulation at breaking an oil-based drill-in fluid filter cake was investigated by making a filter cake in an Ofite double ended HPHT cell (catalogue number OF170-46). The drill-in fluid used was a commercial oil-based drill-in fluid from Angola, based on DF1 base fluid and calcium carbonate.

A filter cake was made on a 10 micron ceramic disc. The ceramic disc was first flooded by adding 100 ml of 4% KCl to the HPHT cell, pressurising to 100 p.s.i. with nitrogen gas and then opening the bottom valve to allow 50 ml of the 4% KCl solution to pass slowly through the ceramic disc in the injection direction. The bottom valve was then closed, the HPHT cell depressurised by opening the top valve and the solution above the ceramic disc was poured away. 25 ml of well-mixed oil-based drill-in fluid was then placed in the HPHT cell and the HPHT cell pressurised to 100 p.s.i. for 1 hour, with the bottom valve open to make a filter cake. The bottom valve was then closed and the HPHT cell was depressurised by opening the top valve and the excess liquid mud above the filter cake on the ceramic disc was poured away. The treatment fluid (100 ml) was then placed in the HPHT cell, which was again pressurised to 100 p.s.i. and incubated at the formation temperature (80° C.).

The treatment fluid used was 2% w/v beta cyclodextrin plus 10% w/v ORCA B** in 1.14 s.g. NaCl/KCl brine.

After 48 hours the bottom valve was opened to assess if the filter cake was broken. The fast rate of fluid flow out of the bottom valve in the injection direction indicated that the filter cake was effectively broken. The cell was opened and the filter cake confirmed to have been effectively disrupted and some of the carbonate dissolved by the formic acid produced from the acid precursor.

A filter cake made from the same mud was also effectively broken by a micellar dispersion treatment formulation comprised of 10% w/v ORCA* 4 plus 10% w/v ORCA B** in 1.14 s.g. NaCl/KCl brine after 48 hours at 80° C.

EXAMPLE 4

Breaking of Oil-Based Drill-In Fluid Filter Cake by a Beta Cyclodextrin-Based Formulation The effectiveness of a cyclodextrin-based formulation at breaking an oil-based drill-in fluid filter cake was investigated by making a filter cake in an Ofite double ended HPHT cell (catalogue number OF170-46). The drill-in fluid used was a commercial oil-based drill-in fluid from the North Sea, based on DF1 base fluid and calcium carbonate.

A filter cake was made on a 10 micron ceramic disc. The ceramic disc was first flooded by adding 100 ml of 4% KCl to the HPHT cell, pressurising to 100 p.s.i. with nitrogen gas and then opening the bottom valve to allow 50 ml of the 4% KCl solution to pass slowly through the ceramic disc in the injection direction. The bottom valve was then closed, the HPHT cell depressurised by opening the top valve and the solution above the ceramic disc was poured away. 25 ml of well-mixed oil-based drill-in fluid was then placed in the HPHT cell and the HPHT cell pressurised to 100 p.s.i. for 1hour, with the bottom valve open to make a filter cake. The bottom valve was then closed and the HPHT cell was depressurised by opening the top valve and the excess liquid mud above the filter cake on the ceramic disc was poured away. The treatment fluid (100 ml) was then placed in the HPHT cell, which was again pressurised to 100 p.s.i. and incubated at the formation temperature (80° C.).

The treatment fluid used was 2% w/v beta cyclodextrin plus 10% w/v ORCA B** in 21.1% w/v NaCl brine.

After 24 hours the bottom valve was opened to assess if the filter cake was broken. The rate of fluid flow out of the bottom valve in the injection direction indicated that the filter cake was partially broken. The valve was closed and the cell left for a further 24 hours. The bottom valve was again opened and the fast rate of fluid flow out of the bottom valve indicated an effective break. The cell was opened and the filter cake confirmed to have been effectively disrupted and some of the carbonate dissolved by the formic acid produced from the acid precursor.

A filter cake made from the same mud was also effectively broken by a micellar dispersion treatment formulation comprised of 10% w/v ORCA* 4 plus 10% w/v ORCA B** in 21.1% w/v NaCl brine after 48 hours at 80° C.

The invention claimed is:

1. A process for removing a filter cake from an underground formation that contains said filter cake, wherein the filter cake formation damage is selected from an oil-based drill-in fluid filter cake or a water-based drill-in fluid filter cake, which process comprises:
   (a) introducing, into the underground formation that contains said filter cake, a treatment fluid comprising water and at least one of (i) a cyclodextrin and (ii) a starch and an enzyme capable of generating a cyclodextrin from the starch; and
   (b) allowing the treatment fluid to remove said filter cake from said underground formation.

2. A process according to claim 1, wherein the treatment fluid further comprises at least one additional component selected from an organic acid precursor, an acid, a chelating agent or a chelating agent precursor.

3. A process according to claim 2 wherein the organic acid precursor is an ester, a lactone, an anhydride, an orthoester, a polyester or a polyorthoester.

4. A process according to claim 2 wherein the organic acid precursor is an organic acid precursor that hydrolyses in the underground formation to produce at least one of formic acid, acetic acid, glycolic acid, lactic acid and gluconic acid.

5. A process according to claim 2 wherein the treatment fluid comprises both an organic acid precursor and a catalyst capable of increasing the rate of hydrolysis of the organic acid precursor.

6. A process according to claim 5 wherein the catalyst is an enzyme, a non-enzyme catalyst or a salt of a carboxylic acid.

7. A process according to claim 2 wherein the acid additional component is a mineral acid or an organic acid.

8. A process according to claim 7 wherein the mineral acid is hydrochloric acid.

9. A process according to claim 7 wherein the organic acid is formic acid, acetic acid, glycolic acid or lactic acid.

10. A process according to claim 2 wherein the chelating agent is nitrilotriacetic acid (NTA), ethylenediamine tetraacetic acid (EDTA), trans-1,2-diaminocyclohexane- N,N,N',N',-tetraacetic acid monohydrate (CDTA), diethylenetriamine pentaacetic acid (DTPA), dioxaoctamethylene dinitrilo tetraacetic acid (DOCTA), hydroxy-ethylethylenediamine triacetic acid (HEDTA), triethylenetetramine hexaacetic acid (TTHA), trans-1,2-diaminocyclohexane tetraacetic acid (DCTA), glutamic acid N,N-diacetic acid (GLDA) or methylglycine N,N-diacetic acid (MGDA).

11. A process according to claim 2 wherein the chelating agent precursor is an ester of a chelating agent, an amide of a chelating agent or an anhydride of a chelating agent.

12. A process according to claim 11, wherein said chelating agent precursor is selected from a precursor of malonic acid, oxalic acid, succinic acid, ethylenediaminetetraacetic acid (EDTA), nitriloacetic (NTA), citric acid, hydroxyacetic acid, glutamic acid N,N-diacetic acid (GLDA) or methylglycine N,N-diacetic acid (MGDA).

13. A process according to claim 2 wherein the at least one additional component dissolves material present in the underground formation.

14. A process according to claim 1 wherein the treatment fluid is introduced into the underground formation via a wellbore which extends to the reservoir.

15. A process according to claim 1 which comprises introducing the treatment fluid into the underground formation via the drillstring, coiled tubing or bullheading of the fluid.

16. A process according to claim 1 which provides for at least one of an increase in the rate of production and rate of injection of wells drilled into the underground formation.

17. A process according to claim 1 wherein the filter cake is a filter cake resulting from drilling with an oil-based or invert emulsion drill-in fluid or a synthetic oil-based drill-in fluid.

18. A process according to claim 1 wherein the filter cake is removed from a sand control completion.

19. A process according to claim 1 wherein the enzyme capable of generating a cyclodextrin from the starch is a cyclodextrin glycosyltransferase enzyme.

20. A process according to claim 1 wherein the cyclodextrin is generated from a starch in the treatment fluid, before and/or after introduction of the treatment fluid into the underground formation, using a cyclodextrin glycosyltransferase enzyme.

21. A process according claim 1 wherein the treatment fluid further comprises at least one selected from (i) one or more water miscible compounds and (ii) mutual solvents.

* * * * *